United States Patent
Varriano-Marston

(10) Patent No.: US 10,687,539 B2
(45) Date of Patent: *Jun. 23, 2020

(54) MODIFIED ATMOSPHERE PACKAGING FOR TRANSPORTATION AND RIPENING OF BANANAS AND PLANTAINS WITH EXTENDED QUALITY PRESERVATION

(71) Applicant: Windham Packaging, LLC, Windham, NH (US)

(72) Inventor: Elizabeth Varriano-Marston, Windham, NH (US)

(73) Assignee: Windham Packaging, LLC, Windham, NH (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/980,102

(22) Filed: May 15, 2018

(65) Prior Publication Data
US 2018/0255796 A1    Sep. 13, 2018

Related U.S. Application Data

(63) Continuation of application No. 12/733,470, filed as application No. PCT/US2008/010209 on Aug. 28, 2008, now Pat. No. 10,010,089.

(30) Foreign Application Priority Data

Sep. 4, 2007   (WO) ................ PCT/US2007/019277

(51) Int. Cl.
*A23B 7/152*   (2006.01)
*B65B 25/04*   (2006.01)
(Continued)

(52) U.S. Cl.
CPC ............. *A23B 7/152* (2013.01); *A23B 7/148* (2013.01); *A23L 3/01* (2013.01); *B65B 25/041* (2013.01);
(Continued)

(58) Field of Classification Search
None
See application file for complete search history.

(56) References Cited

U.S. PATENT DOCUMENTS 2,689,678 A    9/1954  Wendt
3,450,542 A    6/1969  Badran
(Continued)

FOREIGN PATENT DOCUMENTS

EP    244234 A2    11/1987
EP    519229 A2    12/1992
(Continued)

OTHER PUBLICATIONS

Exam Report dated May 29, 2015 for Canadian Application No. 2,698,005, 3 pages.
(Continued)

*Primary Examiner* — Viren A Thakur
(74) *Attorney, Agent, or Firm* — Maine Cernota & Rardin

(57) ABSTRACT

A packaging apparatus suitable for containing and transporting a specified quantity of bananas or plantains includes a vented box and a plastic bag that includes laser microperforations located in target areas separated from each other by distances greater than their largest dimensions. When the bag is placed within the box, filled with bananas or plantains, and hermetically sealed, the microperforations and box vents allow for limited transmission of gases into and out of the bag to establish a modified atmosphere within the bag, and to allow ethylene ripening of the bananas or plantains. The target areas are located at the top of the bag, and also at the bottom of the bag, so that they are not occluded when the bananas or plantains are placed within the bag with their concave sides facing down.

14 Claims, 5 Drawing Sheets

(51) Int. Cl.
    *B65D 81/26*    (2006.01)
    *A23B 7/148*    (2006.01)
    *B65D 85/34*    (2006.01)
    *A23L 3/01*     (2006.01)
(52) U.S. Cl.
    CPC ............ *B65D 81/263* (2013.01); *B65D 85/34* (2013.01); *B65D 2565/388* (2013.01)

(56) References Cited

U.S. PATENT DOCUMENTS

| | | | |
|---|---|---|---|
| 3,507,667 A * | 4/1970 | Magnen | A23B 7/148 426/419 |
| 3,552,637 A | 1/1971 | Swinford | |
| 3,718,059 A | 2/1973 | Clayton | |
| 3,798,333 A | 3/1974 | Cummin | |
| 4,672,684 A | 6/1987 | Barnes et al. | |
| 4,895,729 A | 1/1990 | Powrie et al. | |
| 5,492,705 A | 2/1996 | Porchia et al. | |
| 5,525,130 A | 6/1996 | Beaudry | |
| 5,617,711 A | 4/1997 | Rodriguez et al. | |
| 5,698,249 A | 12/1997 | Hayashi et al. | |
| 5,899,084 A | 5/1999 | Franaszek et al. | |
| 5,919,504 A | 7/1999 | Muise et al. | |
| 6,190,710 B1 | 2/2001 | Nir et al. | |
| 6,730,874 B2 * | 5/2004 | Varriano-Marston | B23K 26/0846 219/121.71 |
| 7,083,837 B1 | 8/2006 | Varriano-Marston | |
| 2002/0127305 A1 | 9/2002 | Clarke | |
| 2005/0051450 A1 | 3/2005 | Sanabria et al. | |
| 2005/0266129 A1 | 12/2005 | Mir | |
| 2006/0121167 A1 | 6/2006 | Roman | |
| 2011/0293802 A1 | 12/2011 | Alfaro et al. | |

FOREIGN PATENT DOCUMENTS

| | | |
|---|---|---|
| EP | 823387 A1 | 2/1998 |
| WO | 9425583 A1 | 11/1994 |
| WO | 9702753 A1 | 1/1997 |
| WO | 9708325 A2 | 3/1997 |
| WO | 9728243 A1 | 8/1997 |
| WO | 9856680 A2 | 12/1998 |
| WO | 2005118770 A2 | 12/2005 |

OTHER PUBLICATIONS

"Guide Packaging Fresh Fruit and Vegetables", Danish Technological Institute Packaging and Transport, 2008, 26 pages [online] [retrieved from internet on Mar. 11, 2015] Retrieved from URL: <http://www.modifiedatmospherepackaging.com/~/media/Modifiedatmospherepackaging/Pictures/Guide%20%20%20Packaging%20of%20Fresh%20Fruit%20and%20Vegetables%20%20%20PDF%20file.ashx>.

Sivertsvik, M. et al., "Minimal Processing Technologies in the Food Industries", Woodhead Publishing, 2002, 10 pages.

Brody, Aaron L. et al., "Modified Atmosphere Packaging for Fresh-Cut Fruits and Vegetables", Wiley-Blackwell Publishing, 2011, 7 pages.

Mir, Nazir et al., "Modified Atmosphere Packaging", Michigan State University, 2001, 10 pages.

Kader, Adel A., "CA '97 Proceedings vol. 3: Fruits Other Than Apples and Pears", 7th International Controlled Atmosphere Research Conference, University of California, Jul. 13-18, 1987, 271 pages.

* cited by examiner

MODIFIED ATMOSPHERE PACKAGING FOR TRANSPORTATION AND RIPENING OF BANANAS AND PLANTAINS WITH EXTENDED QUALITY PRESERVATION

RELATED APPLICATIONS

This application is a continuation of U.S. application Ser. No. 12/733,470, filed Mar. 3, 2010 which is a national phase application of PCT application PCT/US2008/010209, filed on Aug. 28, 2008, which claims the priority of PCT application PCT/US2007/019277 filed on Sep. 4, 2007. All of these applications are herein incorporated by reference in their entirety for all purposes.

FIELD OF THE INVENTION

The present invention generally relates to a method of packaging fresh fruits, especially bananas and plantains. More particularly the present invention relates to a method to control banana and plantain quality by packaging.

BACKGROUND OF THE INVENTION

The quality and shelf life of fresh produce is enhanced by enclosing them in packaging that modifies or controls the atmosphere surrounding the product. The technology is referred to as MAP (modified atmosphere packaging) or CAP (controlled atmosphere packaging). MAP/CAP provides increased quality and longer shelf life resulting in fresher products for the consumer, less waste from spoiled produce, better inventory control, and appreciable overall savings for the food industry at both the retail and wholesale levels.

CAP of fresh produce is just a more controlled version of MAP. It involves a precise matching of packaging material gas transmission rates with the respiration rates of the produce. The goal in fresh produce packaging is to use MAP/CAP to preserve produce quality by reducing the aerobic respiration rate but avoiding anaerobic processes that lead to adverse changes in texture, flavor, and aroma, as well as an increased public health concern. For each respiring produce item, there is an optimum $O_2$ and $CO_2$ level that will reduce its respiration rate and thereby, slow aging and degradation processes. Different fresh produce items have different respiration rates and different optimum atmospheres for extending quality and shelf life.

Bananas pose a unique challenge in MAP/CAP. There is a complex system for distributing bananas which involves harvesting the fruit when it is green, packing the green fruit in cartons, shipping the fruit to distant markets via ocean liners, initiating ripening at the receiving port by gassing the green fruit with ethylene, and after sufficient time is allowed for ripening, the fruit is shipped to the wholesale or retail markets.

Unlike bananas, plantains are sold both as unripe fruit, as well as ripened yellow fruit in the supermarket. Providing ripened fruit to the wholesale or retail markets pose similar challenge as with bananas.

More bananas are consumed around the world than any other fruit. According to FAA, worldwide banana exports are valued at over $4.7 billion per year. Large volumes of bananas are grown and harvested in South America, packed in 40 lb boxes with liners and they are shipped to ports in the U.S., Europe, and Asia where they are gassed with ethylene to initiate the ripening process. Costa Rica and Ecuador are the two largest exporters of bananas.

Plantains are not as widely consumed fruit as bananas, but it has established steady markets especially in the United States. Most of the plantains exported to the United States are shipped in 50 lb boxes from South America.

In order to provide the consumers the best quality of bananas and plantains, the producers are constantly trying to find a technology that would provide maintenance of the green life of bananas during shipping and on the other hand uniform ripening and long yellow life. Banana or plantain green life and banana or plantain shelf life are two competing physiological conditions. By drastically decreasing the oxygen content green life is greatly increased. On the other hand ripening requires ethylene gas.

The currently available technology to maintain the green life while shipping includes depriving oxygen from the bananas or plantains. This may take place, for example, by closing the bananas or plantains in plastic bags having low permeability to oxygen.

Several types of plastic bags have been tested with bananas in an attempt to control ripening and quality. Banavac bags are 1.0-1.5 mil polyethylene bags without holes and are used when green life extension is needed and on vessels that do not have controlled atmosphere. Banavac bags must be torn open before the ripening cycle (ethylene gas treatment) can be initiated, because the gas does not penetrate the bag. The need to rip open the bags before gassing results in added labor costs. Some Banavac bags have ripcords to make it easier to tear open the bags, but easy tear bags do not maintain adequate modified atmospheres because they leak.

Polypack bags are 0.7 mil polyethylene (PE) bags with holes punched in the bags. This bag is used in European markets under most conditions. These bags can not be used to delay ripening of the fruit or to extend the shelf life of bananas because there is no control of the atmosphere inside this type of bag. Similarly, Tubopak bags have holes punched in the bag so that no atmosphere control can be obtained.

Patent application publications WO 01/92118 A2, WO 03/043447 A1, and EP 1 516827 A1 describe banana packaging consisting of a polymer-coated microporous membrane applied over specifically sized holes in the container. The breathable membrane controls the oxygen, carbon dioxide, and ethylene contents inside the package to control ripening (without opening the bag) and to extend the shelf life of bananas after ripening. The breathable patch is generally produced by normal plastic extrusion and orientation processes. By way of example, a highly filled, molten plastic is extruded onto a chill roll and oriented in the machine direction using a series of rollers that decrease the thickness of the web. During orientation, micropores are created in the film at the site of the filler particles. Next, the microporous film is converted into pressure sensitive adhesive patches or heat-seal coated patches using narrow web printing presses that apply a pattern of adhesive over the microporous web and die-cut the film into individual patches on a roll. These processes typically make the cost of each patch too expensive for the wide spread use of this technology in the marketplace, particularly for cost-sensitive produce items like bananas or plantains.

In addition, the banana or plantain packer has to apply the adhesive-coated breathable patch over a hole made in the primary packaging material (bag) during the packaging operation. To do this, the packer must purchase hole-punching and label application equipment to install on each packaging equipment line. These extra steps not only increase packaging equipment costs, but also greatly reduce packaging speeds, increase packaging material waste, and therefore, increase total packaging costs.

Microporous material can be used only as patches on the packages basically due to two reasons: 1) high cost of the material and 2) the material is inherently opaque thereby allowing inspection of the packed material only when applied as patches. Specifically related to banana or plantain packaging, the microporous material has to be attached only to a limited area in order to be able to control the atmosphere inside the bag. If the bag would be made fully out of the microporous material the total OTR of the bag would be much too high, resulting in ambient air conditions (20.9% O2/0.03% CO2) inside the bag. This would prevent the controlled ripening of the bananas or plantains and yellow life extension.

An alternative to microporous patches for MAP/CAP of bananas or plantains is to microperforate polymeric packaging materials. Various methods can be used to microperforate packaging materials: cold or hot needle mechanical punches, electric spark and lasers. Mechanical punches are slow and often produce numerous large perforations (1 mm or larger) throughout the surface area of the packaging material, making it unlikely that the atmosphere inside the package will be modified below ambient air conditions (20.9% $O_2$, 0.03% $CO_2$). Equipment for spark perforation of packaging materials is not practical for most plastic converting operations, because the packaging material is typically submerged in either an oil bath or a water bath while the electrical pulses are generated to microperforate the material.

The most efficient and practical method for making microperforated packaging materials for controlled atmosphere packaging of fresh produce is using lasers. U.S. Pat. No. 5,832,699, UK Patent Application 2 221 692 A, and European Patent Application 0 351 116 describes a method of packaging plant material using perforated polymer films having 10 to 1000 perforations per $m^2$ (1550 per $in^2$) with mean diameters of 40 to 60 microns but not greater than 100 microns. The references recommend the use of lasers for creating the perforations, but do not describe the equipment or processes necessary to accomplish this task. They describe the limits of the gas transmission rates of the perforated film: OTR (oxygen transmission rate) no greater than 200,000 cc/$m^2$-day-atm (12,903 cc $O_2$/100 $in^2$-day-atm), and MVTR (moisture vapor transmission rate) no greater than 800 g/$m^2$-day-atm (51.6 g/100 $in^2$-day-atm). However, the OTR of a film does not define the total $O_2$ Flux (cc $O_2$/day-atm) needed by a fresh produce package to maintain a desired $O_2$ and CO2 internal atmosphere based on the respiration rate of the specific produce item, the weight of the produce enclosed in the package, the surface area of the package, and the storage temperature. A 50-micron perforation has a very small surface area ($1.96 \times 10^{-9}$ $m^2$) and a low $O_2$ Flux (about 80 cc/day-atm) compared to its very high OTR (>200,000 cc $O_{2_1}$ $m^2$-day-atm). Therefore, one 50-micron perforation would exceed the OTR limit of this invention. Furthermore, since the microperforations placed throughout the length and width of the packaging and are not registered in a well-defined area on the packaging, they can be easily occluded during pack out, shipment or display by produce, adjacent bags, or marketing labels applied on the package. The result is a wide variability in the gas transmission rates of the packaging materials.

U.S. Pat. Nos. 6,441,340, 6,730,874, and 7,083,837 disclose a microperforated packaging material, where the microperforations are specifically tailored in size, location and number for the specific produce to maintain pre-selected $O_2$ and $CO_2$ concentrations. The method to make registered microperforations according to these patents uses a $CO_2$ laser and a sensor mechanism.

Microperforated packaging material can be used successfully to control the $O_2$ and $CO_2$ concentrations inside fresh produce packaging. However, the fact that the microperforations are through holes or drill holes through the material would suggest that the material is not at all functional for banana packaging. This is for two reasons: one would expect that the holes would provide an easy access for microorganisms into the package and secondly, one would expect that the material would not effectively prevent dehydration of the bananas. It also seems that the packing into bags according to this disclosure have a twofold effect on disease development: Infections that have occurred after cutting (in the field) and during the washing/packing operations are unable to develop further due to direct action of high $CO_2$ inhibiting fungal growth, and indirect effect of high $H_2O$ reduces the severity of symptoms.

The concern of the access of microorganisms into the banana or plantain package is a real one, as one of the main problems with banana and plantain shipping is infection of the fruit by crown rot disease. Crown rot is a pathological disease caused by a fungal complex (species of *Fusarium*, *Penicillium* and *Colletotrichum*) and, although infection occurs during harvesting and packing, symptoms may not be obvious until after ripening.

Accordingly, currently available technologies provide materials for generally packaging fresh fruits. Moreover, currently available technologies provide materials to specifically pack bananas for shipping. Even if microporous membranes are capable of controlling the ripening of bananas or plantains, there is a clear need for a cheaper technology. Other currently available banana or plantain packaging technologies leave such unresolved problems as uneven ripening, and exposure of the bananas or plantains to post harvest diseases during shipping.

What is needed to address the shortcomings in current banana/plantain packaging is an efficient and less costly system to produce MAP/CAP packaging for bananas and plantains. There is a clear need for a system that would allow for transmission of oxygen, carbon dioxide, and ethylene gases into and out of the packaging for optimum quality preservation of the bananas or plantains in terms of green life, ripening rate, and extended shelf life. Moreover, there is a need for a system ensuring uniformity of banana and plantain quality with regard to ripening and shelf life. Even further there is a clear need for a system that would prevent post-harvest diseases and retain the fresh weight of the bananas and plantains during transport and storage.

SUMMARY OF THE INVENTION

Accordingly, the apparatus of this invention provides laser microperforated banana and plantain bags having registered microperforation arrays to allow for transmission of oxygen, carbon dioxide, and ethylene gases into and out of the packaging for optimum quality preservation of the fruit.

An object of the present invention is to provide a package and a method to pack fresh bananas or plantain to improve even ripening of the fruit. The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

Another object of the invention is to provide means to evenly control green life and yellow life of bananas and plantains. Yet another object of the invention is to provide a package that controls dehydration of the bananas and plantains while transported or in storage. An even further object of the invention is to provide a package that reduces crown mold and pedicel withering of packaged bananas or plantains during transport and storage. Still another object of the invention is to provide a method to insert the bananas or plantains into the bags without breaking the package and thereby losing the advantage of the specifically designed bags.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings in which.

DETAILED DESCRIPTION

Figure 1:
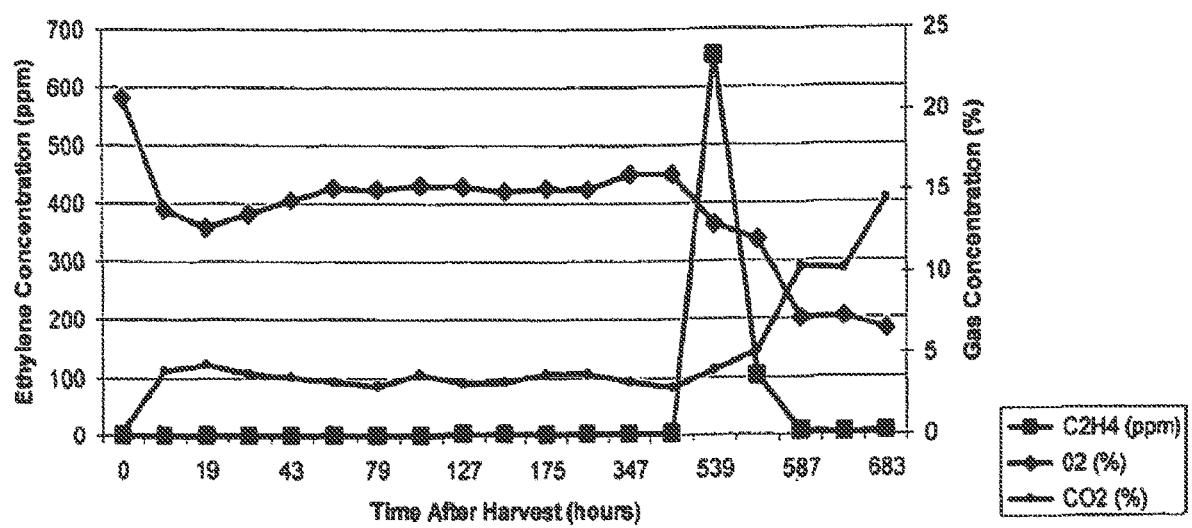
FIG. 1. Illustrates gas contents ($O_2$, $CO_2$, and ethylene) inside microperforated banana bags during storage, before and after ethylene gassing.

Currently available technology for banana and plantain packaging provides solutions that are either expensive (microporous membrane technology) or insufficient to meet the specific needs related to fruit ripening (Banavac bags or Tubopac bags). Therefore, this disclosure addresses these problems and the invention according to this disclosure provides a method to pack bananas and plantains, a method to extend the green life and the shelf life of bananas and plantains, and a method to improve the quality of the bananas and plantains.

Definitions

Green life is defined as the period of time from harvest until ripening is induced (naturally or artificially).

Shelf life of bananas is defined as the time, after ethylene treatment, until the banana peel shows sugar spots (color stage 7).

Banana and plantain color is described in stages by the industry. A color stage of 3.5 to 5 is preferred for bananas placed on sale at retail. At color stage 3, bananas and plantains are 50% yellow and 50% green. At a color stage of 5, bananas and plantains are 95% yellow with slight green color at stem and blossom end.

Registered microperforation means laser perforations registered in a well-defined area(s) of the package. Each microperforation has a preferred average diameter between 110 and 400 microns, and more preferably for bananas between 150-235 microns.

In this disclosure, the units applied to the term used in reference to the $O_2$, transmission rates of a packaging material, i.e., "OTR is expressed as $cc/m^2$-day-atmosphere (or $cc/100\ in^2$-day-atm) at 25° C., 75% RH". In the pressure units, one atmosphere (atm) is 101,325 $kg/ms^2$. Another unit describing the flow of a particular gas through a packaging material is "Flux", expressed as cc/day-atm. The Total $O_2$ Flux of a microperforated package is the sum of the $O_2$ Flux of the base material (e.g. polyethylene) and the $O_2$ Flux of the microperforations. The moisture vapor transmission rate (MVTR) of a material is expressed as g $H_2O/m^2$-day-atm or g/100 $in^2$-day-atm.

The invention is now illustrated further by non-limiting examples.

Example 1: Registered Microperforations Provide a Package that does not have to be Ripped Open to Initiate the Ripening Cycle A small scale study was conducted on packaged 40-lb bananas sealed in registered microperforated bags. The 1.0 mil polyethylene (PE) bags were 40.5" wide and 48.5" long. The bag material can also be selected from polypropylene, polyester, nylon, polystyrene, polyvinyl chloride, polylactic acid in monolayers, coextrusions, and laminates. Microperforations (225 microns in diameter) were drilled into the front and back panels of the bags and were registered at 11.5" down from the open end and 19.5" from either side. The total $O_2$ flux of the bag (base PE film+microperforations) was 61,283 cc/day-atm. The objective was to monitor the gas composition inside the bags during simulated ship transport (3 weeks at 14 C) and after gassing with ethylene for 24 hrs.

FIG. 1 shows the $O_2$, $CO_2$, and ethylene ($C_2H_4$) contents inside these microperforated banana bags. After about 24 hrs, the bananas consumed enough $O_2$ and produced enough $CO_2$ to create a modified atmosphere inside the bags, i.e. about 15% $O_2$ and 3% $CO_2$. Levels of ethylene before gassing were low; ranging from 1-3 ppm. Within 24 hrs of gassing the fruit with 1000 ppm ethylene ($C_2H_4$), ethylene content inside the bags rose to about 600 ppm. These data clearly indicate that ethylene can enter the bags via the microperforations, making it unnecessary to rip open the bag to initiate ripening. After the ripening room was vented, the levels of $C_2H_4$ in the bags rapidly dropped to 150 ppm and then to about 3 ppm during continued storage.

Concomitant with the surge of ethylene into the bags, respiration rate of the bananas increases as evidenced by the decrease in $O_2$ and increase in $CO_2$ levels inside the bags. During this ripening process $O_2$ levels dropped to 5-6% and $CO_2$ levels rose as high as 14%. These reduced $O_2$ levels and elevated $CO_2$ levels will slow ripening rates and account for slower color development in bananas stored in modified atmospheres compared to those stored in ambient air.

Example 2: Green Life of Bananas can be Increased and Ripening Delayed by Packing in Registered Microperforated Bag In order to test whether packing bananas in registered microperforated bags would increase the green life and delay ripening we conducted this test and compared effects of three package types. Forty-lb boxes of green bananas packed in one of three types of bags were held at 18° C. The bag types were Polypack bag, Banavac bag and Registered microperforated bag with one location of microperforations per side. Microperforations were drilled into PE bags (40.5" wide×48.5" L×1 mil thick), registering the microperforations 17" down from the open end and 19.5" from the side. Front and back panels of the bags had the same number and placement of microperforations. Registered microperforated bags tested were one of two total $O_2$ fluxes: 47,844 cc/day-atm (referred to at RMP1) and 59,805 cc/day-atm (referred to as RMP2). The two different $O_2$ fluxes were made by varying the number and/or size of the microperforations drilled into the PE, with the average size of microperforations being 225 microns.

The time required for the first cluster to ripen was recorded. This time was considered the end of "green life" for those bananas. Table 1 shows the green life (days) for bananas packed in Polypack, Banavac, and registered microperforated bags.

TABLE 1

Green life of bananas packed in different bags.

| Bag Type | Average Green Life (days) | Green Life Range (days) |
|---|---|---|
| Polypack | 21 | 14-26 |
| Banavac | 47 | 32-59 |
| Registered Microperforated Bags | 33 | 27-38 |

Banana green life and banana shelf life are two competing physiological conditions. By drastically decreasing the oxygen content in the bag, as the Banavac bag does, green life is greatly increased; 26 days over bananas held in ambient air (Polypack bags) (Table 1). However, unless the Banavac bags are torn open, the bananas will not ripen. In contrast, bananas sealed in registered microperforated bags showed an increase in green life by 12 days (up to 57% increase) compared to Polypack bananas. Bananas in RMP1 and RMP2 bags gave similar green lives.

Figure 2:
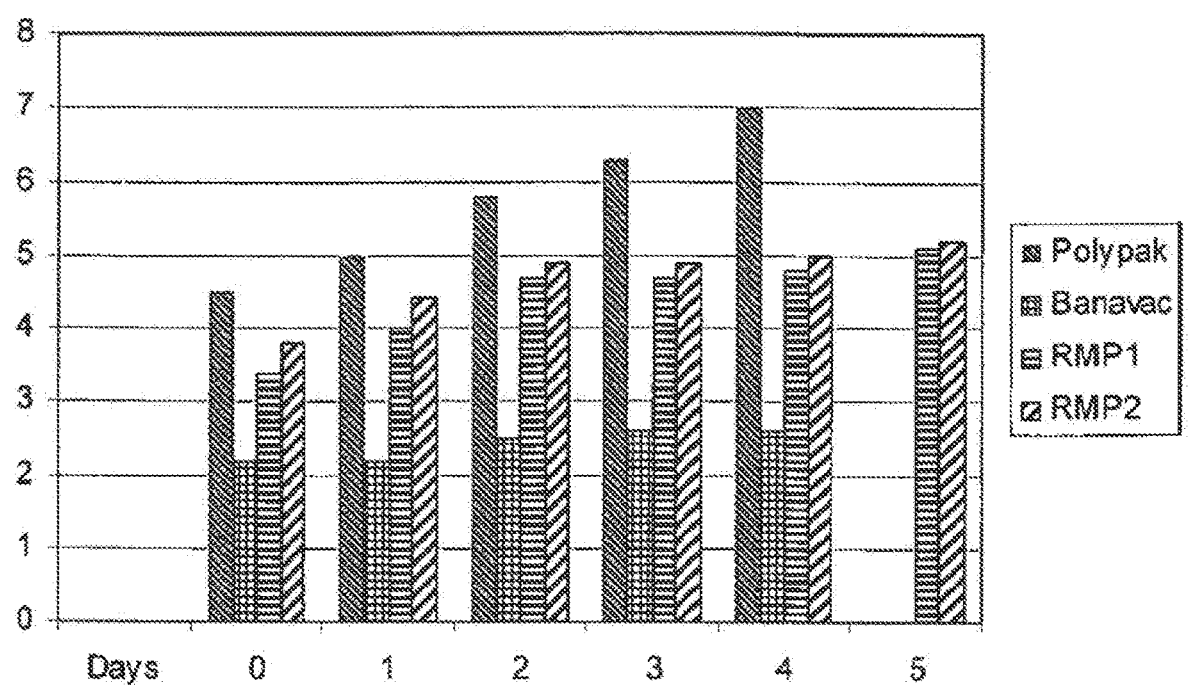
FIG. 2. Illustrates ripening cycle of bananas packed in either Polypack bags, Banavac bags or registered microperforated bags after ethylene gas treatment. Day 0 marks the end of ethylene gas treatment. The total $O_2$ flux of the RMP1 bags was 47,844 cc/day-atm while the total $O_2$ flux of RMP2 bags was 59,805 cc/day-atm.

Unlike unopened bananas in Banavac bags, during the ripening cycle (ethylene gas treatment) bananas in the sealed microperforated bags carried on normal ripening to a color stage of 3.5 without opening the bags while Polypack bags reached a color stage of 4.5 in the same time period as can be seen in FIG. 2. Therefore, it is clear that microperforated bags delayed the ripening of the fruit. Furthermore, unlike the green life results where the $O_2$ fluxes of RMP1 and RMP2 bags had similar effects on green life even though the RMP2 flux was 20% higher than RMP1, $O_2$ flux did affect the ripening rate of bananas as can be seen in FIG. 2.

When the gassed bananas were held at 22° C. to simulate storage conditions at the retail store, bananas in Banavac bags did not ripen at all. In fact, Banavac bananas produced soft green bananas after 4 days. Polypack bananas reached a color stage of 7 after 4 days post-ripening, compared to bananas in registered microperforated bags which changed to a color stage of 5 after days. Therefore, post-ripening studies show that registered microperforated bags delay ripening, increasing the shelf life of bananas compared to Polypack and Banavac bags.

Example 3: Shipping Test Shows that Microperforations Become Occluded During Pack-Out Procedures Based on the results of the laboratory tests of Examples 1 and 2 above, we designed a shipping test to compare the effects of packing bananas in registered microperforated bags (one microperforation location) versus packing them in Polypack bags. The PE bag composition, dimensions, microperforation number and registration location and the total $O_2$ flux of the bags were the same as given in Example 1 above.

Four pallets of each bag type were packed out in South America and shipped to a U. S. port for evaluation. Once the bananas arrived at the port, they were placed in ethylene gassing chambers and gassed for 24 hrs and then placed in storage rooms at 14.4° C. for 8 days.

Table 2 shows the gas contents inside the various packages and the color range developed by bananas in those packages 8 days after gassing. There was a wide variability in the oxygen and carbon dioxide contents inside microperforated bags, suggesting that the microperforations were occluded in some bags during the pack-out procedures.

TABLE 2

Headspace gas content and color development in 40-lb banana bags 8 days after gassing with ethylene.

| Box # | % O2/% CO2 | Color Range After 8 days |
|---|---|---|
| 1 | 12.9/5.7 | 4.0-5.0 |
| 2 | 0.5/10.3 | 2.0-2.5 |
| 3 | 2.2/10.4 | 2.0-2.5 |
| 4 | 1.2/10.0 | 2.5-3.0 |
| 5 | 1.4/10.2 | 2.5-3.0 |
| 6 | 0.7/10.2 | 2.0-4.0 |
| 7 | 6.2/8.6 | 2.0-3.0 |
| 8 | 0.9/9.9 | 2.5-4.0 |
| 9 | 5.6/9.1 | 3.5-4.0 |
| 10 | 1.3/9.3 | 2.0-2.5 |
| 11 | 0.5/10.2 | 2.0-2.5 |
| Control | Ambient air | 5.0-5.5 |
| Control | Ambient air | 5.0-5.5 |
| Control | Ambient air | 5.5-6.0 |

When the oxygen and carbon dioxide contents inside microperforated bags were 12.9 and 5.7%, respectively, the banana color range was 4.0-5.0 which is 1 to 1.5 units lower than the range for banana in control bags. The controls were at a color stage of 5.5 to 6.0. Such reduction in color stage development by the test bags is desirable if these values are consistent. However, microperforated bags with oxygen contents of 1% or less and carbon dioxide contents of 8% or more, produced bananas with color ranges of 2.0 to 2.5, and some bags with carbon dioxide values greater than 10% produced soft green fruit, an undesirable situation. Again, the data suggested that the microperforations were occluded during pack-out.

Example 4: Location of Microperforations on the Banana Bag Affects Color Development In order to solve the problems indicated in the previous example we conducted several studies to determine the effect of microperforation location on banana color development. All bags tested had the same oxygen flux, but different microperforation locations. In some bags, the microperforations were located in one location near the top center of the bag and on both front and back panels. In other bags, microperforations were placed in two locations near the bottom of the bag which would correspond to the location of the side vent holes in the carton. Bananas packed in these bags were held for two weeks at 14.4° C. before exposing to ethylene gas ripening cycle of five days. As was demonstrated before, bananas inside microperforated bags had a color of 2.5 to 3 after the ripening cycle compared to a color of about 4 for Polypack bags and opened Banavac bags. This demonstrated, once more, that the microperforations allowed ethylene gas to penetrate the bags and initiate ripening, although the ripening was delayed compared to controls. Furthermore, Table 3 shows that fruit in microperforated bags developed color more slowly during after-gassing storage studies at 18° C. Polypack and Banavac bananas (after the Banavac bags were ripped open so ripening could occur) changed from a color of 4 to 5 after 1 day to a color of 6 after 6 days at 18° C. Bananas in bags with one microperforation location at the top of the bag had a wide range of colors stages (3.5 to 5 after 6 days), while bananas in bags with two microperforation locations placed at the bottom of the bag near the carton vent holes showed more uniform color development, with colors of 3.5-4.0, than bananas in bags with one microperforation location. In all microperforated bags, shelf life was increased compared to bananas in Polypack and Banavac bags.

TABLE 3

Color development in banana clusters 1, 4 and 6 days after gassing with ethylene.

| BAG TYPE | DAY | % CLUSTERS | CLUSTER COLOR |
|---|---|---|---|
| Polypack | 1 | 61% | 4.0-5.0 |
|  | 4 | 81% | 5.0-5.5 |
|  | 6 | 64% | 6.0 |
| Banavac | 1 | 50% | 4.5 |
|  | 4 | 48% | 5.5 |
|  | 6 | 60% | 6.0 |
| RMP*Bags1 microperf location/side at the top | 1 | 48% | 3.0 |
|  | 4 | 51% | 3.0-5.0 |
|  | 6 | 58% | 3.5-5.0 |
| RMP* Bags 2 microperf locations/side at the bottom of the bag at the bottom | 1 | 63% | 3.0 |
|  | 4 | 60% | 3.5 |
|  | 6 | 85% | 3.5-4.0 |

*Registered Microperforated Bag

The need for more than one microperforation location in banana bags was demonstrated in another ship test of 40-lb bananas packaged in S. A. and shipped to the U.S. Whenever the microperforations were located only in the bottom of the bag, the bananas in the bottom portion of the bag (after the ripening cycle) developed desirable color stages while the bananas at the top of the bag (in the same box) remained green. Conversely, when the microperforations were located only at the top of the bag, the bananas at the top developed desirable color stages while those at the bottom remained green. However, with two microperforation arrays per side in the bags, one at the top and one at the bottom, more uniform color development occurred throughout the bag.

When packing the bananas in boxes the bag must be carefully placed in the box so that the microperforation zone will be aligned with the vents in the bottom and top of the box. Importantly, boxes where bananas are packed in bags according to this invention can be stored on pallet for up to two days, because the modified atmosphere in the bags slows the metabolic rate of the bananas and thus reduces generation of heat. In contrast, boxes with bananas in Banavac bags must be de-palletized and air-stacked because the heat released by the ripening fruit inside the Banavac bag causes the fruit to become soft.

In order to minimize risk of breaking (puncturing) the microperforated bag, and to provide cushioning for the bananas, the following method was found preferable for packing: A heavy weight piece of paper (tunnel pad) is placed in the bottom of the box followed by the plastic bag. The tunnel pad is perforated in the area that is placed over the vent hole in the bottom of the box. Banana clusters (concave side down) are arranged in the box in four rows of approximately five clusters per row. The first row is set next to one of the long sides of the box, which allows room for the second row to be put on top of the first row but offset to the opposite long side of the box. The plastic bag is pulled up and over the tunnel pad and this triple layer of packing material is folded over the first two rows of fruit. This folding creates a pocket to hold the third row of fruit as well as creating a cushion that reduces bruising. Similarly, the bag and tunnel pad are pulled over the second and third rows of fruit to create a pocket into which the fourth row of fruit is packed. The remaining bag material is gathered together and pushed through the vent hole in the box lid as the upper half of the box is slipped over the lower half. Air is extracted from the bag with a vacuum cleaner; the bag is twisted, folded over on itself and wrapped several times with a strong rubber band to seal it.

Example 5: Importance of Leak-Free (Hermetic) Seals in Maintaining Desired Gas Atmospheres Inside Banana Bags It is important to have hermetic seals in packaged bananas to attain consistent control of the atmosphere inside. Variable leakage rate at the seal or through punctures in the bags produces variable results. In this study with 3-lb microperforated banana bags, we found that the method used to close the bag greatly affected the $O_2$ and $CO_2$ contents inside the bags (Table 4). Bags that were tape-closed using a pressure sensitive adhesive-coated plastic tape, produced mainly leaky bags with $O_2$ levels averaging 17%. In contrast, a rubber-band closure technique where the neck of the bag is twisted, folded over, and secured with a rubber band yielded an average $O_2$ content of 14%. Clearly, better control of the atmosphere inside the package was achieved by executing a tight (hermetic) seal using the rubber band technique. Hermetic bag seals can be attained by a number of other methods besides a rubber-band closure technique described here. For example, heat-sealing the bag will provide a hermetic seal.

TABLE 4

Effect of bag closure method on headspace gas contents (at 13.3° C.) inside 3-lb microperforated banana bags before ethylene gassing.

| Tape Closure | | Rubber Band Closure | |
|---|---|---|---|
| $O_2$ | $CO_2$ | $O_2$ | $CO_2$ |
| 15.6 | 1.4 | 15.4 | 1.5 |
| 17.6 | 0.3 | 15.0 | 1.8 |
| 17.8 | 0.2 | 14.7 | 2.5 |
| 18.1 | 0.2 | 13.9 | 2.1 |
| 16.4 | 1.1 | 14.3 | 2.1 |
| 16.3 | 1.2 | 14.6 | 2.1 |
| 16.0 | 1.2 | 9.7 | 2.3 |
| 16.5 | 1.1 | 12.4 | 2.5 |
| 17.2 | 0.4 | 15.0 | 2.0 |
| 18.8 | 0.1 | 15.1 | 1.9 |
| Mean ± std. dev. | | Mean ± std. dev | |
| 17.0 ± 1.0 | 1.8 ± 0.5 | 14.0 ± 1.7 | 2.1 ± 0.3 |

Figure 3:
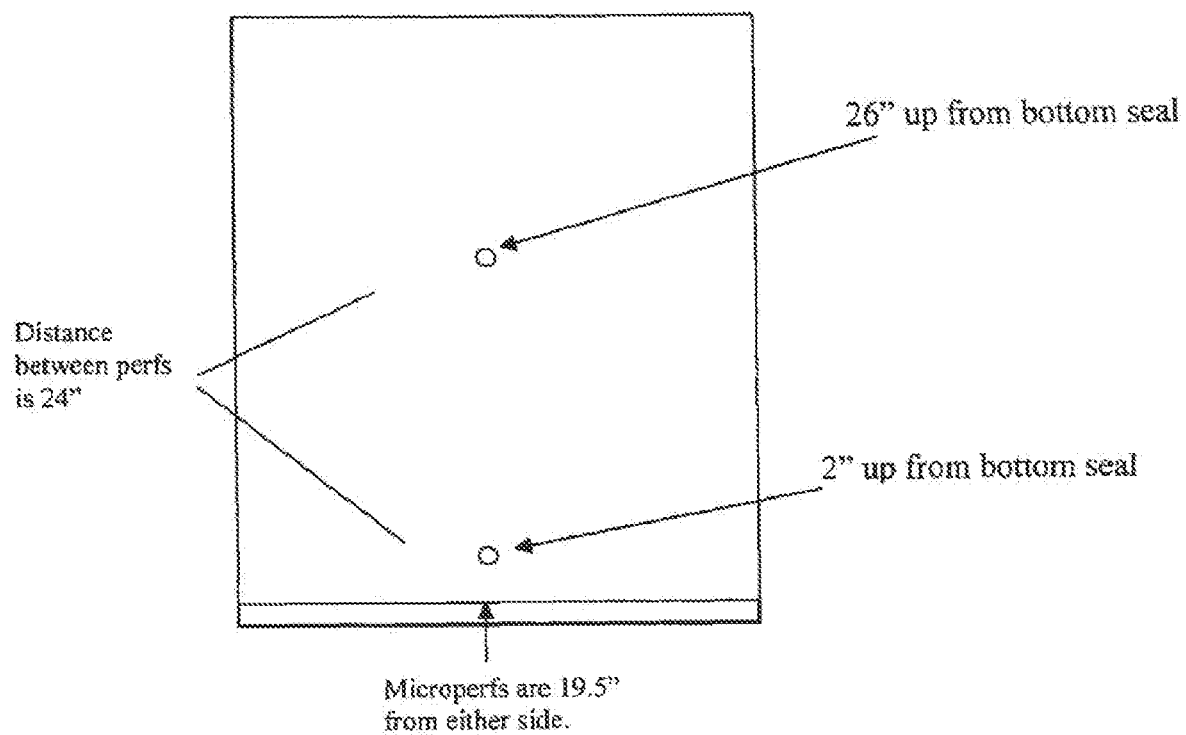
FIG. 3 illustrates microperforations registered in a 40-lb polyethylene banana bag according to this disclosure (38.5" wide×50.5" long×1.5 mil) at 2" and 26" up from the bottom seal and 19" from the edge. Microperforations are in both the front face and the back face so there are 4 locations (2 front, 2 back) per bag.

Example 6: Effects on Ripening and Shelf Life, and Unexpected Effect of Microperforations on Crown Mold and Pedicel Withering Ship Test: Tubopak v. Registered Microperforated Bags for 40 lb Bananas. The objective of this study was to determine the effects of bag type (registered microperforated v. Tubopack) on the quality of 40 lb bananas, before gassing and after gassing. Tubopack bags have 84, ½" diameter holes. Polyethylene bags (1.5 mil, 38.5" wide×50.5" long) were laser microperforated with 225-230 micron holes in specific areas on the bag as depicted in FIG. 3. These microperforated bags had 4 microperforation locations, 2 sets in the front of the bag and 2 sets in the back of the bag. For both the front and the back of the bag, the first set of microperforations was placed 26" up from bottom seal and the second set was placed 2" up from the bottom seal. The total $O_2$ flux of the bags averaged 82,294 cc/day-atm.

Once the microperforated bags were filled with bananas and the bag was intertwined among the different layers of bananas, the bags were sealed by first gathering all corners of the bag together, twisting them into a "neck", folding over the neck, and securing with a rubber band.

Headspace Analysis on Bananas before Gassing:

The bananas arrived at a California port and were discharged within 1 to 2 days. Headspace ($O_2/CO_2$) readings were taken on registered microperforated bags approximately 9 days after the bananas' arrival to the port. The bananas were stored at 13.3° C. before measuring the gas contents inside the bag headspace. Headspace analysis ($O_2$ and $CO_2$ contents) was done on boxes on two different pallets.

TABLE 5

Headspace gas readings (at 13.3° C.) in registered microperforated bag containing 40-lb bananas (before ethylene treatment)

| Location of Box on Pallet | Headspace % O2/% CO2 |
|---|---|
| 4M (front) | 15.6/5.9 |
| 4L (back) | 15.7/5.8 |
| 4L (front) | 16.3/5.5 |
| 5R (back) | 16.4/6.1 |
| 5R (front) | 15.1/6.3 |
| 5M (back) | 15.5/5.8 |
| 5M (front) | 15.7/5.6 |

TABLE 5-continued

Headspace gas readings (at 13.3° C.) in registered microperforated bag containing 40-lb bananas (before ethylene treatment)

| Location of Box on Pallet | Headspace % O2/% CO2 |
|---|---|
| 5L (back) | 16.7/5.3 |
| 5L (front) | 15.1/6.3 |
| 6R (back) | 15.5/6.3 |
| 6R (front) | 16.0/5.5 |
| 6M (back) | 16.5/4.5 |
| 6M (front) | 13.8/6.8 |
| 6L (back) | 16.6/4.9 |
| 6L (front) | 16.5/5.6 |
| 7R (back) | 16.3/5.0 |
| 7R (front) | 14.9/6.7 |
| 7M (fback) | 16.7/5.5 |
| 7M (front) | 15.4/6.2 |
| 7L (back) | 16.1/6.1 |

Table 5 shows the $O_2$ and $CO_2$ content of boxes packed with bananas in microperforated bags before gassing. The readings were very consistent with $O_2$ levels around 16% and $CO_2$ levels between 5% and 7% before gassing with ethylene.

After opening representative control and registered microperforated banana bags, we observed that bananas in the registered microperforated bags maintained moisture levels better than bananas in the Tubopack bags. Tubopack bags caused significant moisture loss, and this was expected since they have 84, ½" diameter holes. Banavac bags don't have holes so they would maintain the moisture content. However, they undoubtedly retain too much moisture inside the bag which could lead to crown mold. The moisture vapor transmission rate (MVTR) of the microperforated bags is far greater than that of the Banavac bag. MVTRs of a 1 mil HDPE Banavac bag is less than 1 g $H_2O/100$ in$^2$-day while the MVTR of microperforated bags is in excess of 100 g $H_2O/100$ in$^2$-day, regardless of bag thickness. Obviously, water vapor can ready pass through the microperforations to reduce the concentration of moisture inside the bag. At the same size hole, the more microperforations, the higher the MVTR. The key is to allow some moisture vapor escape to reduce the growth of mold, but at the same time maintain enough moisture inside the bag to prevent dehydration.

Headspace Analysis on Bananas after Gassing: Bananas were gassed for 24 hours, at 15.5 C, and headspace readings were taken. Again, readings were taken from boxes on two different pallets.

TABLE 6

Headspace gas readings (at 15.50 C.) in registered microperforated bags containing 40 lb bananas (after ethylene treatment)

| Location of Box on Pallet | Headspace % $O_2$/% $CO_2$ |
|---|---|
| 1R (Back) | 4.9/21.5 |
| 1R (front) | 12.8/10.3 |
| 1M (back) | 3.5/22.3 |
| 1M (front) | 12.7/11.4 |
| 1L (back) | 4.1/28.0 |
| 1L (front) | 11.4/13.4 |
| 2R (back) | 1.5/23.5 |
| 2R (front) | 7.2/17.5 |
| 2M (back) | 2.9/22.8 |
| 2M (front) | 6.1/19.0 |
| 2L (back) | 3.0/23.8 |
| 2L (front) | 5.8/21.2 |
| 3R (back) | 7.8/15.1 |
| 3R (front) | 4.8/20.9 |
| 3M (back) | 3.6/21.3 |

TABLE 6-continued

Headspace gas readings (at 15.50 C.) in registered microperforated bags containing 40 lb bananas (after ethylene treatment)

| Location of Box on Pallet | Headspace % $O_2$/% $CO_2$ |
|---|---|
| 3M (front) | 17.4/3.7 |
| 3L (back) | 4.8/19.7 |
| 3L (front) | 2.9/21.5 |
| 4R (back) | 3.7/22.3 |
| 4R (front) | 4.5/21.7 |

Table 6 shows $O_2$ and $CO_2$ levels inside the 40-lb microperforated banana bags after gassing with ethylene. The levels of $O_2$ varied from <1% to 17% with most readings between 3% and 5%. The few unusually high $O_2$ reading may be due to a poor seal, resulting in an increased flux of $O_2$ into the bag. Those readings with $O_2$ less than 1% may be due to microperforation occlusion.

The levels of $CO_2$ varied from 4% to 24% with the majority of the reading between 20% and 23%. We would expect to see a reduction in $O_2$ levels and an increase in $CO_2$ levels after gassing, because ethylene increases the respiration rate of the bananas.

It appears that, in this study most of the seals were good, because they were secured with a rubber band.

After gassing, the bananas in registered microperforated bags were approximately 1.5 stages behind the control (Tubopack) bananas. Bananas packaged in registered microperforated bags were not as ripe as controls, averaging a color stage of 2.5 to 3. In addition, bananas in registered microperforated bags were more uniform in color than control bananas which averaged 3 to 5 color stage (Tables 7 and 8).

More moisture was maintained inside the registered microperforated bags than with the Tubopack bags, and this, undoubtedly, may have helped to prevent withered pedicels during storage (Tables 7 and 8). Bananas in registered microperforated bags showed no withered pedicels while controls averaged 9-11% withered pedicels in the light, moderate and severe ranges.

Based on the data collected during this ship test, the use of registered microperforated bags with microperforations in four locations (2 in front and 2 in back) helped to eliminate the non-uniformity of ripening that was observed when only two microperforation locations were used. The twist and tie rubber band closure technique eliminated many of the "leakers" that were observed with tape closures. Compared to Tubopack control bags, the benefits of controlling the atmosphere using registered microperforated bags include: a reduction in the rate of color development, a reduction in moisture loss, and a reduction in crown mold and pedicel withering

TABLE 7

Banana quality in Registered Microperforated Bags after gassing

| | | | Crown Mold (%) | | | Withered Pedicels (%) | | | | |
|---|---|---|---|---|---|---|---|---|---|---|
| Sample | OCA | Clusters | L | M | S | L | M | S | Color | Latex |
| 1 | 2.8 | 18.0 | 0.0 | 0.0 | 0.0 | 0.0 | 0.0 | 0.0 | 2.5 | 33.3 |
| 2 | 2.6 | 19.0 | 0.0 | 0.0 | 0.0 | 0.0 | 0.0 | 0.0 | 2.5 | 10.5 |
| 3 | 2.5 | 17.0 | 0.0 | 0.0 | 0.0 | 0.0 | 0.0 | 0.0 | 2.5-3.0 | 17.6 |
| 4 | 2.5 | 17.0 | 0.0 | 0.0 | 0.0 | 0.0 | 0.0 | 0.0 | 2.5-3.0 | 41.2 |
| Average | 2.60 | 17.8 | 0.0 | 0.0 | 0.0 | 0.0 | 0.0 | 0.0 | 2.5-3.0 | 25.4 |

L: Light,
M: Moderate;
S: Severe

TABLE 8

Banana quality in Tubopack (control) after gassing

| | | | Crown Mold (%) | | | Withered Pedicels (%) | | | | |
|---|---|---|---|---|---|---|---|---|---|---|
| Sample | OCA | Clusters | L | M | S | L | M | S | Color | Latex |
| 1 | 3.0 | 16.0 | 31.3 | 6.3 | 18.8 | 12.5 | 6.3 | 12.5 | 3-5 | 43.8 |
| 2 | 2.5 | 17.0 | 23.5 | 11.8 | 29.4 | 5.9 | 17.6 | 11.8 | 3-5 | 23.5 |
| 3 | 3.2 | 15.0 | 20.0 | 20.0 | 46.7 | 13.3 | 20.0 | 13.3 | 3-6 | 33.3 |
| 4 | 2.8 | 16.0 | 25.0 | 12.5 | 0.0 | 12.5 | 0.0 | 0.0 | 3-5 | 25.0 |
| Average | 2.88 | 16.0 | 25.0 | 12.5 | 23.4 | 10.9 | 10.9 | 9.4 | 3-5 | 31.3 |

Figure 4:
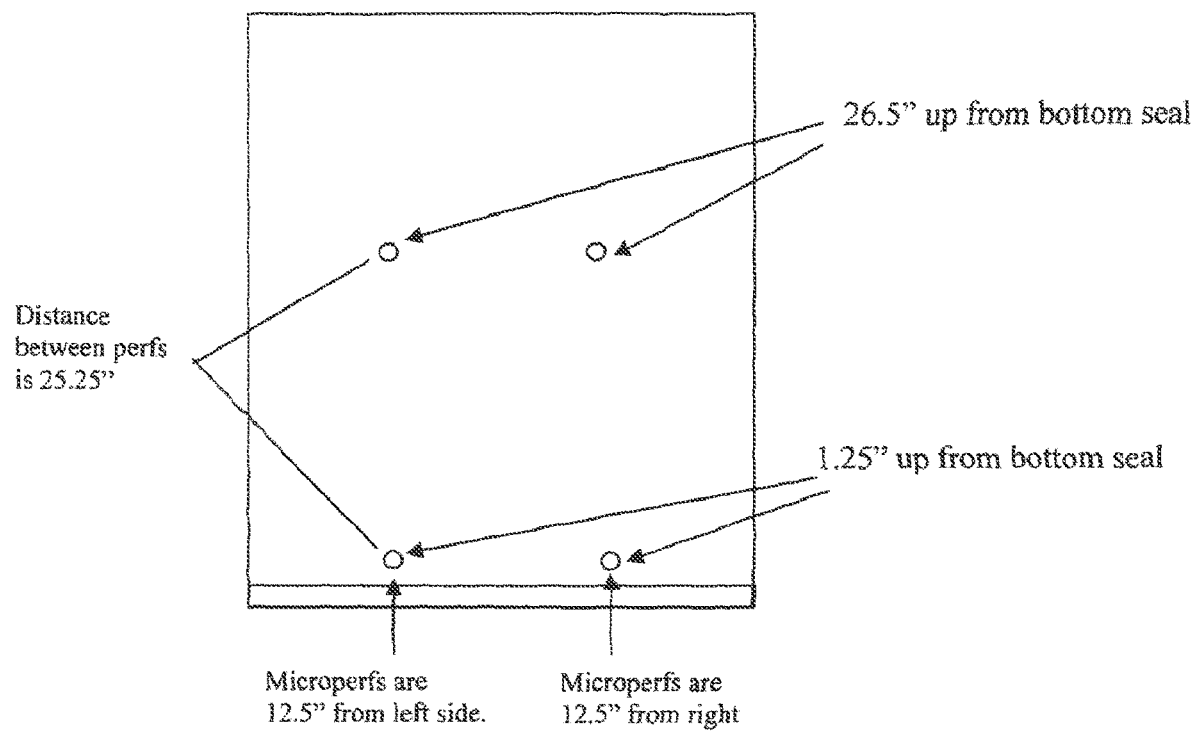
FIG. 4 illustrates microperforations registered in a 40-lb polyethylene banana bag according to this disclosure (38.5" wide×48" long×1.5 mil) at 4 locations per side: 2 locations at 1.25" up from the bottom seal and 12.5" from each side and 2 locations at 26.5" up from the bottom seal and 12.5" from each side.

Example 7: Effects of More than Two Microperforation Locations in Banana Bags on Uniformity of Banana Ripening The effects on uniformity of banana ripening of including more than 2 microperforation locations per bag side was studied in a large ship test from South America. Forty-lb banana bags (1.5 mil PE, 38.5" wide×48" L) were microperforated with 225 micron holes at 4 locations in the front panel and 4 locations in the back panel. The total 02 flux of these bags was the same as the bags in Example 6 above, i.e., 82,294 cc/day-atm. However, the total flux was divided into 4 microperforation locations/side rather than 2/side as in the previous example, FIG. 4 gives the target locations of the microperforations in these bags.

Using 4 microperforation locations/side improved the uniformity of banana ripening compared to only 2 microperforation locations/side. Bananas in bags with two microperforation locations/side showed color stages from 2.5-4.0 after ethylene ripening (Table 9). In contrast, bananas in bags with 4 microperforation locations/side showed a narrower color range of 3.0-4.0 after ripening. The data also show that color development during storage at room temperature was delayed by 1 to 1.5 stages for bananas packaged in microperforated bags compared to control packaged (Tubopack) bananas. Furthermore, bananas packaged in microperforated bags, unlike those packed in Tubopack bags, did not show dehydration, crown rot, yellow crown and withered pedicels during storage, indicating an improved shelf life for bananas stored in microperforated bags.

TABLE 9

Banana color after ripening and storage at room temperature

| Bag Type | Days after ripening | | | | |
|---|---|---|---|---|---|
| | 0 | 1 | 2 | 3 | 4 |
| Tubopack (SOP) | 4.0 (Range = 3-5) | 5.0 | 5.5 | 6.5 | — |
| MP-2 locations | 3.0 (2.5-4.0) | 3.5 | 4.0 | 5.0 | 6.5 |
| MP-4 locations | 3.5 (3.0-4.0) | 4.0 | 4.5 | 5.5 | 7.0 |

*Note:
Dehydration, crown rot, yellow crown and withered pedicel were observed in SOP bag but not in the MP (microperforated) bags Example 8: The Weight of Bananas to be Enclosed in the Bag Determines the Number of Microperforations in the Bag and Microperforation Locations For some retail applications, it may be desirable to market a single banana (a finger) enclosed inside a small microperforated bag. The number of microperforations needed to control the quality of a single banana in a bag is far less than required by 40-lbs of bananas in a bag.

A study was conducted to determine if registered microperforated bags would be useful in controlling the quality of single bananas in a 1.25 mil PE bag 3" wide×11.25" long. Four, 150-micron microperforations were drilled into each side of the bag at a location of 5" up from the bottom seal. The total $O_2$ Flux of the bag was 1920 cc/day-atm. Naked (no packaging) single finger bananas showed a color stage of 5.0 after the ripening cycle (Day 0) compared to a color stage of 4.0 for those packaged in the microperforated bag (Table 10). In addition, there was delayed color development for bananas packaged in the microperforated bag compared to the naked bananas after 2 and 4 days storage at room temperature. Therefore, the microperforated bags extended the shelf life of the single finger bananas compared to no packaging.

TABLE 10

Banana color after opening and storage at room temperature

| Type of Packaging | Days after ripening | | | | |
|---|---|---|---|---|---|
| | 0 | 1 | 2 | 3 | 4 |
| No Packaging- Naked Single Finger Banana | 5.0 | — | 6.5 | — | — |
| Single Finger Banana | 4.0 | — | 5.0 | — | 6.5 |

Example 9: Plantain Fruits Ripen Uniformly in 50-Lb Microperforated Bags

Figure 5:
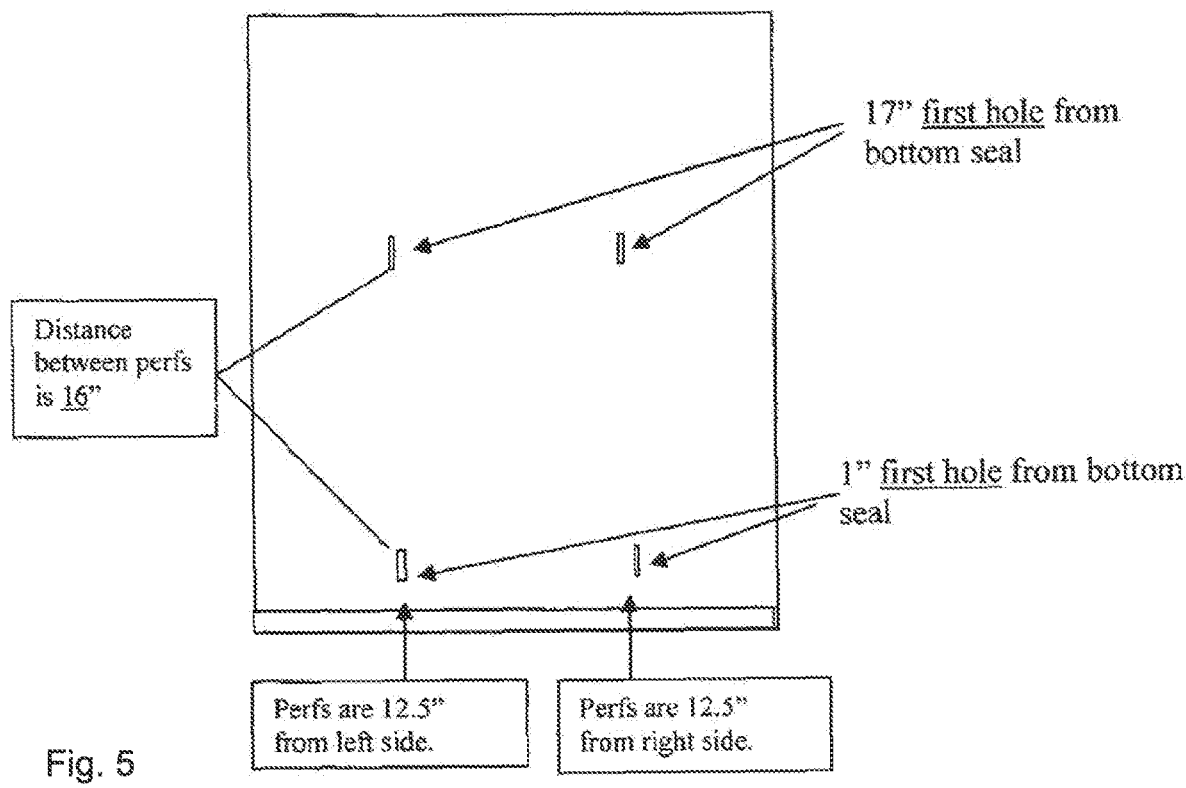
FIG. 5. Illustrates microperforations registered in a 50-lb polyethylene plantain bag according to this disclosure (38" wide×35" long×1.5 mil) at 4 locations per side: two location at 1" up from the bottom seal and two locations 17" up from the bottom seal and 12.5" from the left and right side of the bag.

Green plantain fruits were packed in microperforated bags designed for 50 lb of plantains. The bag material was 1.5 mil thick PE Blend with an oxygen transmission rate of 350 cc $02/100$ in$^2$ day-atm. Bag dimensions were 38" wide and 35" long. Each bag had four positions of microperforations on each side of the bag. FIG. 5 shows the locations of the microperforations.

Two set of microperforations were drilled into the front and back panels of the plantain bag at the following locations: 1" up and 17" up from the bottom seal of the bag and 12.5" from each bag side (FIG. 5). Each microperforation had an average diameter of 225-230 microns. The total $O_2$ Flux of the bag was 82,294 cc/day-atm, which is the same $O_2$ Flux that was used for 40 lbs bananas. Besides the differences in the fruit weight going into the bag (50 lbs plantain v. 40 lbs bananas), there is a difference in microperforation placement on the bag (cf. FIGS. 4 and 5).

With the appropriate microperforation number and placement, plantain fruits ripened uniformly in these hermetically closed bags to color stage 3-4. Plantains in registered microperforated bags did not show crown rot, yellow crown or withered pedicels during storage, indicating an improved shelf life for plantains stored in microperforated bags.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A packaging apparatus containing bananas or plantains, and suitable for both ripening and extending the shelf life of said bananas or plantains, the apparatus comprising:
   a box;
   a plastic bag placed within the box, said plastic bag having a bottom at a closed distal end thereof, and a sealed top at a proximal end thereof; and
   a plurality of bananas or plantains contained within the plastic bag and positioned having their concave sides facing down toward a bottom of the box;
   said plastic bag being penetrated by laser microperforations located only in a distributed plurality of target areas on the plastic bag, each of said target areas including a plurality of said microperforations, each of said target areas being separated from all neighboring target areas by distances that are greater than the target area's largest dimension, each of said microperforations having an average diameter of between 100 microns and 400 microns;

said target areas including target areas located at both the bottom and the top of the plastic bag, wherein the target areas at the bottom of the plastic bag are provided in locations that are not occluded by said bananas or plantains; and each of said target areas being an array of the microperforations.

2. The apparatus according to claim 1, wherein the bag material is selected from the group of plastics consisting of polyethylene, polypropylene, polyester, nylon, polystyrene, polyvinyl chloride, polylactic acid in monolayers, coextrusions, and laminates.

3. The apparatus of claim 1, wherein the proximal end of the bag is hermetically sealed by gathering together a proximal portion of the bag, twisting the gathered portion into a neck folding over the neck, and securing the neck.

4. The apparatus according to claim 1, wherein there are 4 or 6 target areas on the bag.

5. The apparatus of claim 1, wherein the bag has a front side and a back side, and there are at least three target areas on the front side of the bag and in at least three target areas on the back side of the bag.

6. The apparatus of claim 1, wherein the box and bag contain 40 lb of bananas, and the target areas include a target area located approximately 2" from the distal end of the bag, and a target area located approximately 26" from the distal end of the bag.

7. The apparatus according to claim 1, wherein each of said microperforations has an average diameter of between 150 microns and 235 microns.

8. The apparatus of claim 1, wherein the box and bag contain 50 lb of plantains and the target areas include a target area located approximately 1" from the distal end of the bag, and a target area located approximately 17" from the bottom seal of the bag.

9. The apparatus of claim 8, wherein the microperforation size is 225-230 microns.

10. The apparatus of claim 1, wherein the microperforations are of sufficient size and number to allow a total $O_2$ flux for the packed bananas to be within a range of 1000 cc/day-atm to 500,000 cc/day-atm.

11. The apparatus of claim 1, wherein the box and bag contain 3 lb of bananas or plantains.

12. The apparatus of claim 1, wherein
the box includes upper vents proximal to a top thereof and lower vents proximal to a bottom thereof; and
the plastic bag is inserted in the box so as to align at least some of the target areas of the bag with corresponding vents in the box.

13. A packaging apparatus containing 40 lbs of bananas or plantains, and suitable for both ripening and extending the shelf life of said bananas or plantains, the apparatus comprising:

a box having upper vents proximal to a top thereof and lower vents proximal to a bottom thereof;
a plastic bag placed within the box, said plastic bag having a sealed bottom and a closed upper end; and, 40 lbs. of bananas or plantains contained within the plastic bag and positioned with their concave sides facing down toward the bottom of the box said plastic bag being laser microperforated in at least one upper target area on a front side thereof 26" up from a bottom seal thereof, at least one upper target area on a back side thereof 26" up from the sealed bottom thereof, at least one lower target area on the front side thereof 2" up from the sealed bottom thereof, and at least one lower target area on the back side thereof 2" up from the sealed bottom thereof, each of said target areas including a plurality of microperforations, each of said target areas being separated from all neighboring target areas by distances that are greater than a largest size of the target area, each of said laser microperforations having an average diameter of between 150 microns and 235 microns, and each of said target areas being an array of the microperforations, said target areas being the only perforations on the bag;
said plastic bag being hermetically sealed by gathering together a portion of the bag, twisting the gathered portion into a neck folding the neck over on itself, and sealing the neck with a rubber band.

14. A packaging apparatus containing bananas or plantains, and suitable for both ripening and extending the shelf life of said bananas or plantains, the apparatus comprising:
a box;
a plastic bag having a bottom at a sealed distal end thereof, and a closed top at a proximal end thereof; and
a plurality of bananas or plantains contained within the plastic bag and positioned with their concave sides facing down toward a bottom of the box;
said plastic bag including laser microperforating located only in target areas, said target areas including at least one upper target area located at the top of the bag on a front side thereof, at least one upper target area located at the top of the bag on a back side thereof, at least one lower target area located at the bottom of the bag on the front side thereof, and at least one lower target area located at the bottom of the bag on the back side thereof, each of said target areas including a plurality of microperforations, each of said upper and lower target areas on the front side of the plastic bag being separated from each other by at least 16 inches, each of said upper and lower target areas on the back side of the plastic bag being separated from each other by at least 16 inches, each of said microperforations having an average diameter of between 100 microns and 400 microns, and each of said target areas being an array of the microperforations.

* * * * *